(12) United States Patent
McQuerrey et al.

(10) Patent No.: US 11,002,075 B1
(45) Date of Patent: May 11, 2021

(54) MINE DRILLING SYSTEM AND RELATED METHOD

(71) Applicant: J.H. FLETCHER & CO., Huntington, WV (US)

(72) Inventors: Sean Joseph McQuerrey, Hurricane, WV (US); Adam Teator, Huntington, WV (US)

(73) Assignee: J.H. FLETCHER & CO., Huntington, WV (US)

( * ) Notice: Subject to any disclaimer, the term of this patent is extended or adjusted under 35 U.S.C. 154(b) by 0 days.

(21) Appl. No.: 16/527,505

(22) Filed: Jul. 31, 2019

Related U.S. Application Data (60) Provisional application No. 62/712,663, filed on Jul. 31, 2018.

(51) Int. Cl.
| | |
|---|---|
| *E21B 7/02* | (2006.01) |
| *E21B 47/09* | (2012.01) |
| *E21C 37/00* | (2006.01) |
| *E21D 20/00* | (2006.01) |

(52) U.S. Cl.
CPC .............. *E21B 7/022* (2013.01); *E21B 7/025* (2013.01); *E21B 47/09* (2013.01); *E21C 37/00* (2013.01); *E21D 20/003* (2013.01)

(58) Field of Classification Search
CPC ................................. E21B 7/025; E21B 7/022
See application file for complete search history.

(56) References Cited

U.S. PATENT DOCUMENTS

| | | | |
|---|---|---|---|
| 5,060,735 A | * | 10/1991 | Agren ..................... E21B 7/025 |
| | | | 175/40 |
| 6,315,062 B1 | | 11/2001 | Alft et al. |
| 6,342,946 B1 | | 1/2002 | Holstein |
| 6,349,249 B1 | | 2/2002 | Cunningham |
| 6,781,683 B2 | | 8/2004 | Kacyra |
| 6,918,453 B2 | | 7/2005 | Haci |
| 7,107,154 B2 | | 9/2006 | Ward |
| 7,267,182 B2 | | 9/2007 | Saha |
| 7,510,029 B2 | | 3/2009 | Gunsaulis |
| 7,681,660 B2 | | 3/2010 | Muona |
| 7,725,232 B2 | | 5/2010 | Makela et al. |
| 7,766,098 B2 | | 8/2010 | Farley |
| 7,802,384 B2 | | 9/2010 | Kobayashi et al. |
| 7,896,107 B2 | | 3/2011 | Gunsaulis et al. |
| 7,899,598 B2 | | 3/2011 | Woon et al. |
| 8,122,974 B2 | | 2/2012 | Kosoric |

(Continued)

*Primary Examiner* — Kristyn A Hall
(74) *Attorney, Agent, or Firm* — King & Schickli, PLLC (57) ABSTRACT

A system for drilling one or more boreholes in a face of a mine passage including markers attached to the mine passage. A drilling machine includes one or more drills for drilling the one or more boreholes, and a first sensor for sensing a position of the markers. Based on the sensed position of the at least two markers, a computer determines: (i) a survey vector generally parallel to the line; and (ii) a face plane generally orthogonal to the survey vector and coincident with a location where the survey vector intersects the face. A controller may be provided for automatically controlling the feeding of the drill(s) based on the location of the face plane and the back plane to form the boreholes in the face. A back plane may also be determined to ensure that all boreholes are drilled to a corresponding depth. Related methods are also disclosed.

21 Claims, 4 Drawing Sheets

(56) References Cited

U.S. PATENT DOCUMENTS

| | | |
|---|---|---|
| 8,210,278 B2 | 7/2012 | Eilo et al. |
| 8,214,073 B2 | 7/2012 | Keskinen |
| 8,418,783 B2 | 4/2013 | Sat et al. |
| 8,464,808 B2 | 6/2013 | Leu et al. |
| 8,548,609 B2 | 10/2013 | Saleniemi et al. |
| 8,743,376 B2 | 6/2014 | Schumacher et al. |
| 8,836,534 B2 | 9/2014 | Field |
| 9,045,950 B2 | 6/2015 | OReilly |
| 9,194,224 B2 | 11/2015 | Muona |
| 9,500,030 B2 | 11/2016 | Pursimo et al. |
| 9,500,079 B2 | 11/2016 | Makela |
| 9,518,822 B2 | 12/2016 | Maynard |
| 9,677,338 B2 | 6/2017 | Braga et al. |
| 9,739,136 B2 | 8/2017 | Tuunanen |
| 9,778,009 B2 | 10/2017 | Muona |
| 9,856,729 B2 | 1/2018 | Ayris |
| 9,951,616 B2 | 4/2018 | Uotila et al. |
| 10,012,068 B2 | 7/2018 | O'Reilly |
| 10,113,413 B2 | 10/2018 | Viens |
| 10,174,614 B2 | 1/2019 | Puura et al. |
| 10,190,288 B2 | 1/2019 | Matson et al. |
| 10,208,595 B2 | 2/2019 | Kouhia et al. |
| 10,233,755 B2 | 3/2019 | Liu et al. |
| 10,392,863 B2 | 8/2019 | Muona |
| 2012/0279782 A1* | 11/2012 | O'reilly ............... E21B 7/025 175/40 |
| 2013/0332875 A1 | 12/2013 | Heikkila et al. |
| 2015/0204149 A1 | 7/2015 | O'Reilly |
| 2017/0067341 A1 | 3/2017 | Baiden |
| 2017/0074040 A1 | 3/2017 | Muuttonen et al. |
| 2017/0082748 A1 | 3/2017 | Nishita |
| 2017/0241205 A1 | 8/2017 | Comacchio et al. |
| 2017/0243383 A1 | 8/2017 | Gillan |
| 2017/0356730 A1 | 12/2017 | Wang et al. |
| 2017/0363421 A1 | 12/2017 | Kumagai |
| 2018/0112514 A1 | 4/2018 | Ayris |
| 2019/0032433 A1 | 1/2019 | Sawa |
| 2019/0078425 A1 | 3/2019 | Gillan |

* cited by examiner

MINE DRILLING SYSTEM AND RELATED METHOD

This application claims priority to U.S. Provisional patent application 62/712,663, filed Jul. 31, 2018, the disclosure of which is incorporated herein by reference.

TECHNICAL FIELD

This disclosure relates to the mining arts and, more particularly, to a mine drilling system and method for drilling utilizing sensors to sense characteristics of the material to be drilled for applying a pre-determined drilling plan.

BACKGROUND

In tunneling, mining and excavation, including underground mining and excavation, it is common to drill holes in a face of rock or earth. For example, holes may be drilled into a face of rock, which may be filled with explosives for detonation and excavation. In addition, drilling may occur in a face or roof of a mine for insertion of a bolt, such as to support a shaft of the mine. Normally direction and orientation of drilling machines for such drilling procedures is done manually and relies on an operator's judgment as to where and how such holes may be drilled, including the orientation and direction of the drilled holes themselves.

In the case of a plurality of holes being drilled, operator judgment may lead to imprecise directions and endpoints within the rock face for each of the holes. This can lead to variations in the path of the mine passage, and an uneven rock face after blasting in the context of excavation. In addition, manual drilling of a rock face, roof, or wall, is generally slower than automated drilling. At least one reason for this slower nature of manual drilling is that uneven rock faces are normally scaled to dislodge loose rock. Rock faces that are blasted cleanly and evenly will have less loose rock hanging on the rock face.

Consequently, it would be advantageous to have one or more sensors positioned on or around the drilling machine to sense an aspect of the environment surrounding the drilling machine, such as proximity sensors to detect an individual or object approaching the drilling machine. The sensors may be connected to a controller adapted to stop or prevent forward motion of the drilling machine upon detection of an object or individual.

Accordingly, this disclosure contemplates a system and method of automating drilling of a mine face in order to achieve consistent and reliable results in the context of using a drilling machine to create drilled holes, saving time and increasing accuracy.

SUMMARY

In accordance with one aspect of the disclosure, a system for drilling one or more boreholes in a face of a mine passage including at least two markers attached to the mine passage in a line is provided. The system includes a drilling machine including a drill for drilling the borehole, and a first sensor for sensing a position of the at least two markers. A computer associated with the drilling machine is configured to determine, based on the sensed positions of the at least two markers: (i) a survey vector generally parallel to the line; and (ii) a face plane generally orthogonal to the survey vector and coincident with an approximate location where the survey vector intersects the face.

In one embodiment, a second sensor is configured to scan at least a portion of the face to be drilled. The second sensor may comprise a LiDAR unit, and may be a front sensor positioned on a front portion of the drilling machine. The second sensor may further comprise side sensors located on opposite side portions of the drilling machine. The first sensor may be located on a rear portion of the drilling machine and directed rearwardly for sensing the at least two markers.

In one embodiment, the computer is configured to utilize the survey vector and the face plane to apply a pre-determined drilling pattern to the face to be drilled. The computer may include a plurality of drilling vectors, each of the plurality of drilling vectors corresponding to one of a plurality of boreholes to be drilled in the face. The computer may be configured to calculate a back plane, wherein a distance between the back plane and the face plane is equal to a depth of the plurality of boreholes to be drilled. A depth of each of the plurality of boreholes to be drilled in the face may be approximately equal, such that a distance between the back plane and the face plane is the same along each of the plurality of drilling vectors. Alternatively, a depth of a first of the plurality of boreholes to be drilled may be different from a depth of a second of the plurality of boreholes to be drilled, such that a distance between the back plane and the face plane is different along a first of the plurality of drilling vectors than along a second of the plurality of drilling vectors.

The computer may be configured to communicate with a controller for controlling a position of a boom associated with the drill. The second sensor may be configured to generate a laser curtain at a predetermined distance between the drilling machine and the face and continuously monitor the laser curtain for a breach thereof. The computer may be configured to prevent movement of the drilling machine or generate an alarm in response to a detection of the breach of the laser curtain.

According to a further aspect of the disclosure, a system for drilling boreholes in a face of a mine passage including at least two markers attached to the mine passage in a line is provided. The system includes a vehicle including a pair of booms, each including a drill for drilling one borehole and a feed for feeding the drill toward the face. A first sensor is provided on a rear portion of the vehicle for sensing a position of the at least two markers. A second sensor is provided on a front portion of the vehicle for sensing a topography of the face. A computer is configured to determine, based on the sensed positions of the at least two markers and the sensed topography of the face: (i) a survey vector generally parallel to the line; (ii) a face plane generally orthogonal to the survey vector and coincident with an approximate location where the survey vector intersects the face, and (iii) a back plane corresponding to a depth of the boreholes to be drilled. A controller is also provided for controlling the feeding of the drills based on the location of the face plane and the back plane to form the boreholes in the face.

This disclosure also relates to a method for use in drilling a borehole in a face of a mine passage using a drilling machine, the mine passage including at least two markers arranged in a line. The method comprises determining a survey vector generally parallel to the line, and determining a face plane generally orthogonal to the survey vector and coincident with an approximate location where the survey vector intersects the face of the mine passage. The method further includes the step of drilling the plurality of boreholes at the determined face plane according to a drilling pattern including a drilling vector for each of the plurality of boreholes.

The method may further include the step of determining the survey vector comprises determining the location of the at least two markers using a LiDAR unit. The method may further include the step of determining the face plane comprises scanning the face using a LiDAR unit. The method may include the step of determining a back plane corresponding to an equal depth for each of the plurality of boreholes to be drilled. The method may further include generating a laser curtain at a predetermined distance between the drilling machine and the face, monitoring the laser curtain for a breach thereof, and stopping movement of the drilling machine upon detecting the breach.

BRIEF DESCRIPTION OF THE DRAWINGS

The accompanying drawings incorporated in and forming a part of the specification, illustrate several aspects of this disclosure, and together with the description serve to explain the principles of the disclosure. In the drawings.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the embodiments and like numerals represent like details in the various figures. Also, it is to be understood that other embodiments may be utilized, and that process or other changes may be made without departing from the scope of the disclosure. The following detailed description is not to be taken in a limiting sense, and the scope of the invention is defined only by the appended claims and their equivalents. In accordance with the disclosure, an automated drilling system is hereinafter described.

Figure 1:
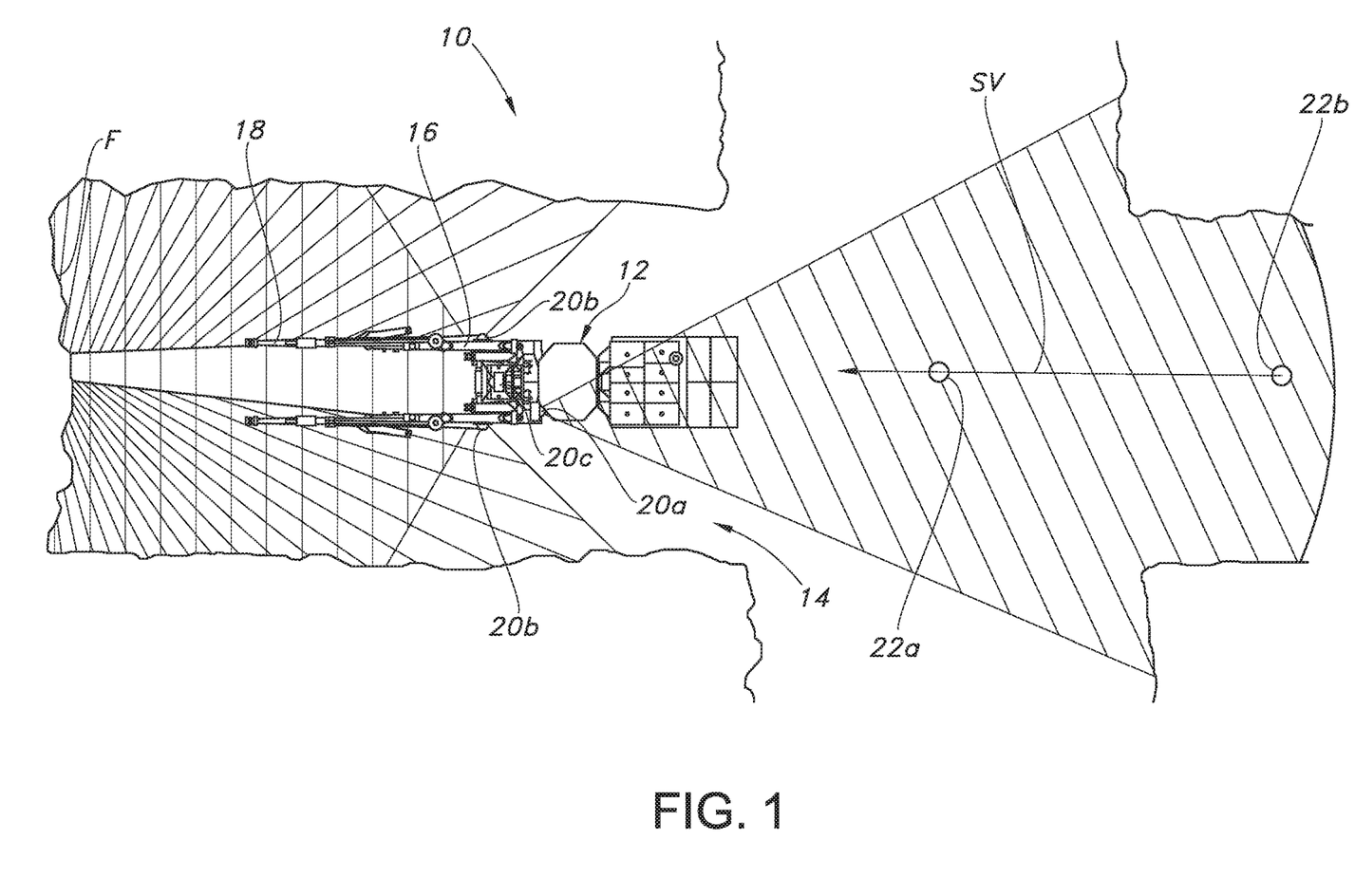
FIG. 1 is a top view of a drilling system forming one aspect of this disclosure.
Figure 2:
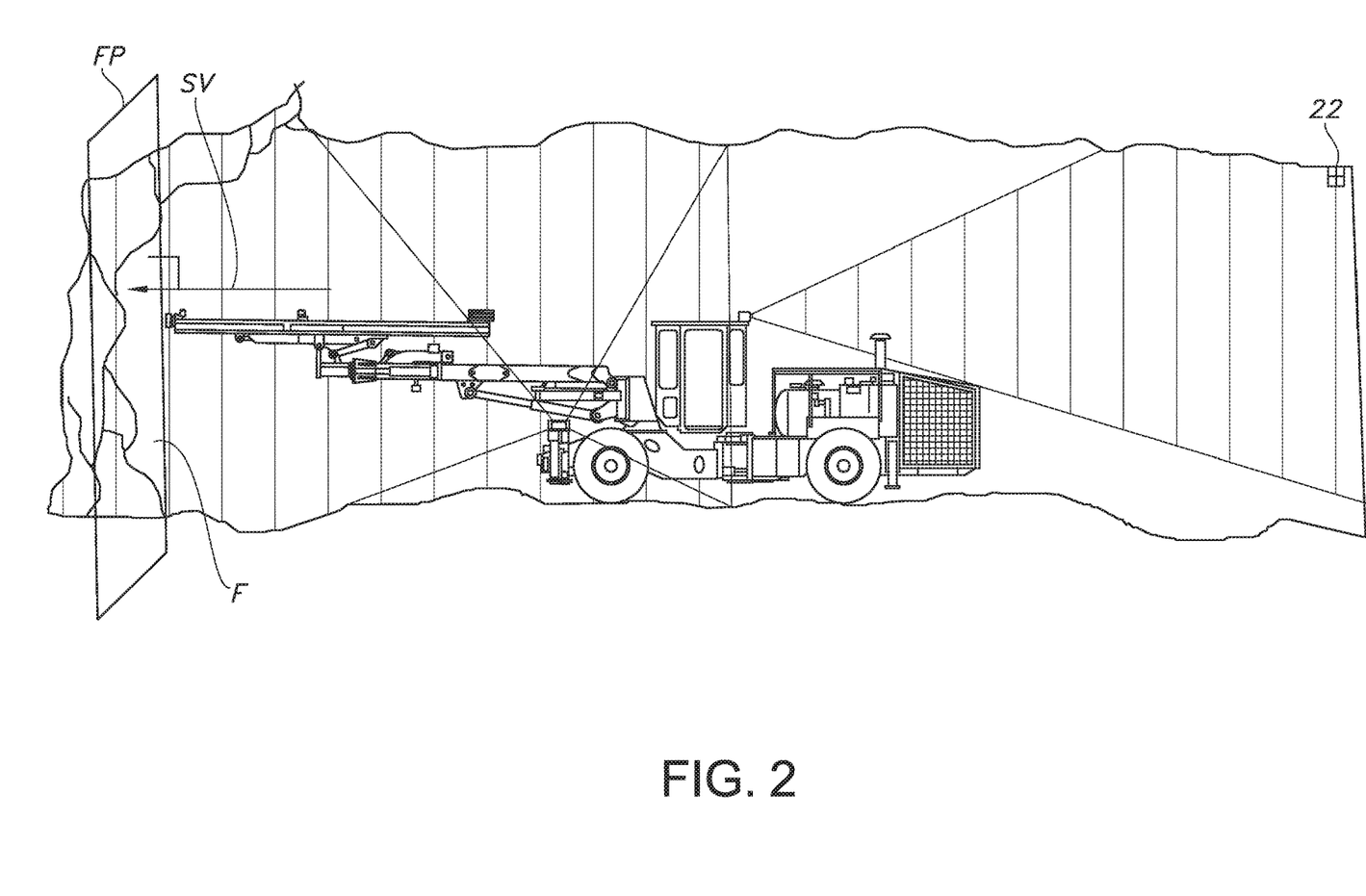
FIG. 2 is a side view of a drilling system forming one aspect of this disclosure.

With reference to FIGS. 1 and 2, a system 10 for drilling boreholes, or "holes," is disclosed. The drilling system 10 may be adapted for use in combination with a drilling machine 12 adapted for use in an underground mine passage 14. The drilling machine 12 may be of the "jumbo" type of wheeled vehicle common in the mining industry, but other types of drilling machines could also benefit from the disclosed concepts.

The drilling machine 12 may include one or more booms 16, which may be associated with one or more drill feeds 18. These booms 16 and drill feeds 18 may be manipulated to various positions with respect to the drilling machine 12 in order to access different portions of a face F of the mine to be drilled. For example, one or more actuators or controllers, such as hydraulic cylinders, may be associated with the boom 16 and/or the drill feed 18 to articulate the boom and drill feed at different angles and positions so as to access different portions of the face F to be drilled and to orient and position the drilled holes.

One or more sensors 20 may be used to sense an aspect of the environment surrounding the drilling machine 12, i.e. characteristics of the material to be drilled, such as location and/or topography of the surface to be drilled. These sensors 20 may comprise a LiDAR-based sensor, which may communicate with and be controlled by a controller or computer 30 associated with the drilling machine 12, and in communication with a machine controller 40 (FIG. 4) for automatically controlling the drilling process (or alternatively, a display for displaying parameters of a drilling operation to an operator for manual drilling). A LiDAR unit 24 forming part of the sensor(s) 20 may be adapted to survey or model the environment adjacent the drilling machine 12, such as through the use of pulsed laser light. Specifically, the LiDAR unit may be adapted to measure reflected pulses of the laser light, which may be used to create a representation of the environment. In other aspects, the sensors 20 may comprise other technologies adapted for scanning and/or otherwise evaluating the environment surrounding the drilling machine 12, such as machine (computer stereo) vision.

Figure 4:
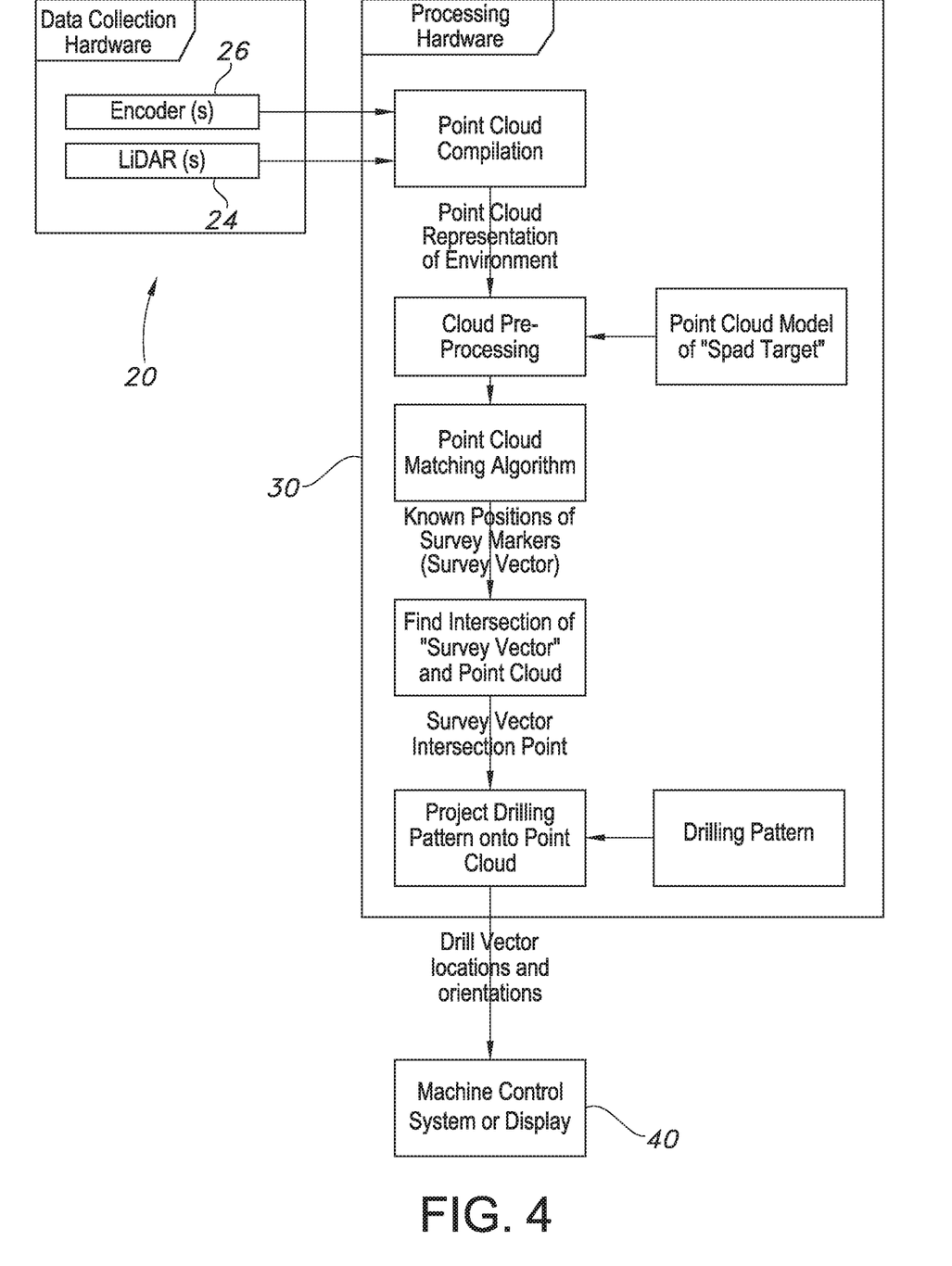
FIG. 4 is a flow chart.

For example, as indicated in FIG. 4, the LiDAR unit 24 may be mounted to a drive unit (motor), which may be rotatable, and may be coupled to an encoder 26. The LiDAR unit 24 may be adapted to create a plurality of 2-D scans of the environment, typically in the vertical direction. As the drive unit rotates, the LiDAR unit 24 may be adapted to take the plurality of 2D scans, which may be used to generate a 3-D cloud or representation of the environment (such as by reading the encoder 26 at approximately the same time as the LiDAR unit(s)). Alternatively, several laser/detector pairs may be provided on one LiDAR unit, resulting in 3-D scans being taken directly from the LiDAR, then rotated.

At least one of the sensors may be rear sensor 20a positioned on a rear portion of the drilling machine 12, and thus may serve to evaluate the environment behind the drilling machine 12. At least two markers 22a, 22b may be positioned in the mine passage 14 behind the drilling machine 12, so as to form a line. These markers 22a, 22b may comprise a spade, nail, hook, eye, or other element that may be fixed within the mine passage 14. For example, the markers 22a, 22b may be attached to a roof of the mine passage 14. The markers 22a, 22b may include one or more identifiable properties, such as a unique shape in the form of a sphere, a luster, a light emitting property, etc. This identifiable property allows a position of the markers 22a, 22b to be more accurately detected by the sensor 20 and then used to create a 3-D point cloud of the associated portion of the mine passage (i.e., the roof).

As shown in FIG. 1, the location of the markers 22a, 22b (as sensed by the sensors 20) may align to form a line, which may be used to generate a survey vector SV. The survey (or heading) vector SV defines a heading direction for the drilling machine 12. Thus, the markers 22a, 22b may be positioned (such as by a machine operator) so as to define the survey vector SV and, therefore, determine the heading direction of the drilling machine 12.

As indicated in FIG. 4, the cloud data obtained by sensor(s) 20 may be pre-processed using algorithms such as statistical outlier removal, point rejection based on distance, and point rejection based on perceived intensity of the point reading. An algorithm may then be used to determine the whether the point cloud model of the markers 22a, 22b is represented and its position and orientation inside the point cloud representation of the environment (such as using an iterative closest point algorithm). From the known positions of the markers 22a, 22b, an equation of a line is generated, which is the survey vector.

With further reference to FIG. 1, one or more side sensors 20b may be used to evaluate the environment along the sides of the drilling machine 12. These side sensors 20b may be mounted on the sides of the drilling machine, such as along the front corner of each side. This placement of the side sensors 20b may allow for scanning and/or mapping of the side walls, the roof, and/or part of the face F to be drilled. This scanning via the side sensors 20b may allow for the generation of a 3D point cloud representation of the heading surface. The heading surface refers to the face to be drilled, as well as the roof and walls of the entry of the mine passage 14.

A front sensor 20c may be provided for evaluating an environment in front of the drilling machine 12. The front sensor 20c may be particularly useful in the case of a drilling machine 12 having a dual boom configuration, as illustrated in FIG. 1. For example, the front sensor 20c may be used in evaluating the portion of the heading surface, such as the face F to be drilled, which may be obscured from the side sensors 20b by one or both of the booms 16 and/or drill feeds 18.

One application of the front sensor 20c may involve coordination between the front sensor 20c and the side sensors 20b. Under normal tramming operation of the drilling machine 12, the two booms 16 may be generally aligned toward the center front of the drilling machine 12. In such case, the side sensors 20b may scan first, evaluating the side walls and roof, and possibly at least a portion of the face F to be drilled. After the side sensors 20b have scanned the environment, the booms 16 may be moved outward toward the side from center of the drilling machine 12, and the front sensor 20c may then be adapted to scan the environment in front of the drilling machine 12 once the booms have been cleared from the line of sight to the front environment.

It should be appreciated that one or more of the sensors 20 may be used as a proximity detector or guard. For example, after the scanning of the environment is complete, each of the side sensors 20b may be rotated and used as proximity detectors along each respective side of the drilling machine 12. Specifically, once the scanning of the surface of the rock is finished, the sensors 20b may scan a 2-D plane at a particular location, which is then rotated such that the 2-D plane is orthogonal to the longitudinal axis of the drilling machine 12. The sensors/proximity detectors may be adapted to create a light or laser curtain, i.e., an invisible array of lines or light from the drilling machine to the surface of the passage on each side of the machine.

The sensors 20 may continuously scan or monitor the 2-D plane of the laser curtain or light curtain in order to determine if anything, such as a miner or other worker or another piece of mining equipment, i.e., a drilling or transport machine, breaches, interrupts or otherwise changes the 2-D plane being scanned. In other words, the sensors 20 may be adapted to determine if an object or an individual breaks the plane of the laser curtain or light curtain, which would necessitate that tramming/drilling cease, i.e., not occur when an object is sensed within the particular plane.

The laser curtain or light curtain created by the proximity detectors/sensors may be directed in any direction chosen by a user. In one embodiment, the side sensors 20b may be turned forward from the front corners of the drilling machine 12, thereby creating a laser curtain or light curtain in front of the drilling machine 12. Similarly, the rear sensor 20a may be adapted to create a laser curtain or light curtain behind the drilling machine 12, thereby allowing for detection of an object or individual approaching from behind the drilling machine. In addition, all of the sensors may be utilized as proximity sensors such that any object or individual may be detected from around the entirety of the drilling machine 12.

In the event that an object, such as an individual or other mobile machine or item of equipment, breaks the plane created by the proximity sensor(s), the drilling machine may stop moving. Specifically, the sensor output may be provided to the computer 30, which can stop the motion of the drilling machine in the direction of the detection of the object or individual and/or initiate an alarm to alert the operator of the breach. The breach may be in the form of an audio warning (i.e., an alarm), a visual warning (i.e., a light) or both. As with the side sensors 20b, the rear sensor 20a may be connected to the same controller as the side sensors, a different controller or the computer. Again, the computer 30 and/or controller may be adapted to stop or prevent rearward motion of the drilling machine 12 upon detection of an object approaching from the rear, i.e., upon a breach of the laser curtain.

With further reference to FIG. 2, the survey vector SV may be used to determine a face plane FP, which may be used to orient a drilling pattern on the face F to be drilled. The face plane FP is generally orthogonal to the survey vector SV and generally coincident with the face F to be drilled. The onboard computer 30 may receive the locations of the markers 22a, 22b from the at least one rear sensor 20a and determining the survey vector SV, and then determining the face plane FP orthogonal to the survey vector SV. One or more displays (not shown) may be associated with the computer for visualizing one or more of the 3-D point cloud representation, the survey vector SV, and the face plane FP.

Specifically, by using the equation of the line that represents the survey vector SV, an algorithm may be used to find the distance to each individual point in the point cloud. The closest N points are taken and processed further to determine the "validity" of each closest point, such as by determining whether it the point is within a threshold distance to the other points or being within a threshold distance to the survey vector. By taking the average of the closest points, a point is determined that is a close representation of the point where the survey vector intersects the point cloud.

In one aspect, the survey vector SV may be used in coordination with the 3D point cloud created by one or more of the sensors 20 to calculate a reference point, which is the approximate location at which the survey vector SV penetrates the face F to be drilled. The face plane FP may then be calculated such that its surface normal vector has the same direction as the survey vector SV and the reference point is on the face plane FP. In other words, the one or more sensors 20 align the face plane FP with the face F to be drilled.

Figure 3:
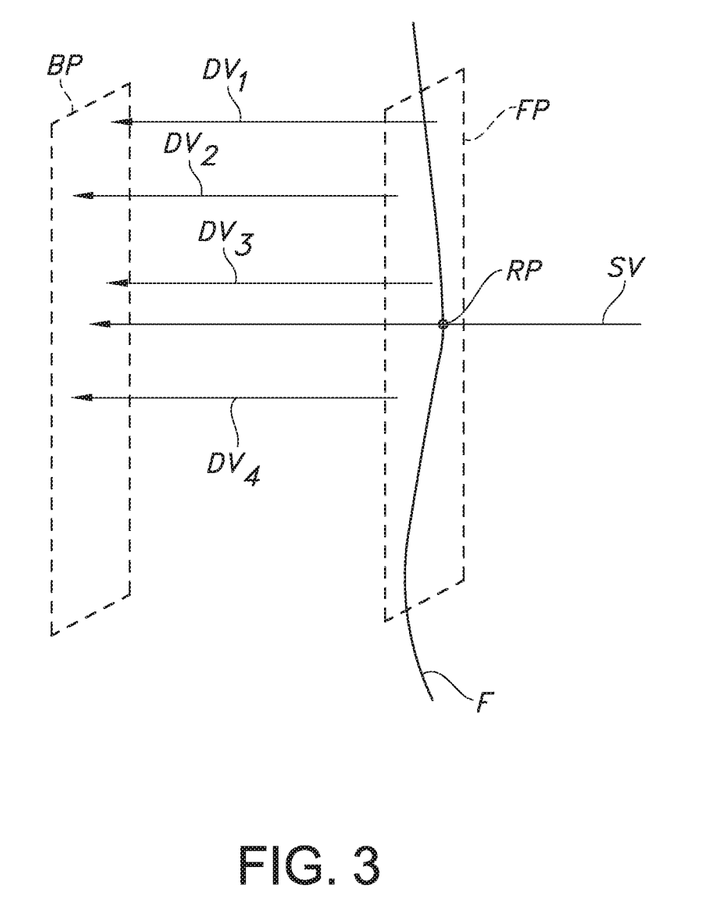
FIG. 3 is a view of four drilling vectors included in a particular hole pattern forming one aspect of this disclosure.

With reference to FIG. 3, the face plane FP may be computationally advanced or moved forward until it coincides with the scanned face to be drilled at the reference point RP corresponding to the survey vector SV. In one aspect, a hole or drill pattern may be associated with the face plane FP. The hole or drill pattern may be pre-determined and associated with the face plane FP by the computer 30. The drill pattern may include a location and a drilling vector DV for one or more holes to be drilled in the face F, as well as a reference point for which all of the drill locations have an offset. By aligning this reference point to the reference point RP where the survey vector SV intersects the face plane FP, the 3D drilling pattern is projected onto the face plane FP. By using an algorithm, such as the intersection algorithm discussed above, the system 10 then knows the location and direction of each drill vector DV in real space.

As further illustrated in FIG. 3, four drilling vectors $DV_1$, $DV_2$, $DV_3$, and $DV_4$ are shown to be included in the depicted hole pattern, but it is understood that any number of holes and corresponding drilling vectors may be included in the hole pattern. Like the illustrated survey vector SV, the drilling vectors DV may be orthogonal to the face plane FP, or may include an orientation other than orthogonal to the face plane FP, such as in the case of a heading correction, or a directional change in the excavation of material.

The computer may be further adapted to calculate a back plane BP, which represents a depth to which the holes of the hole pattern may be drilled, i.e., a number of parallel holes may be drilled in the face to a desired depth. This back plane BP may be determined based on a start position of the hole locations, angles of the drilling vectors DV, and a desired drilling depth (e.g., a predetermined depth, or a maximum depth of the drill feed). The back plane BP may be offset from the face plane FP at a distance to which an excavation will occur. For example, the back plane BP may be generated parallel to the face plane FP and offset into the face F at a maximum distance such that all the to be drilled holes can reach it.

Using the machine control system 40 to control the booms 16 and drill feed 18, any or all drilling holes may be drilled to the same back plane BP at the desired depth at a predetermined angle. Consequently, when the face F is blasted, the new face, which would generally coincide with the back plane BP, has a plurality of drilled holes which will be even along the back plane BP so that when blasting occurs, a relatively smooth new surface is created. The computer 30 may be adapted to automatically control the boom(s) 16 and/or the drill feed(s) 18 via machine controller 40 to create the boreholes at the desired locations, angles, and depths. Alternatively, the computer 30 may determine the calculated locations, angles, and depths of the drill holes, and may provide these calculated values to a user, such as via a display (see box 40 in FIG. 4) for manual drilling. Upon completion of drilling the holes of the drill pattern, the boom or booms 16 may be returned to the center of the drilling machine 12 (i.e. the tram position) for tramming, and the above-procedure may be repeated as necessary or desired.

In the case of a desired excavation path deviating from the survey vector SV, such as in the case of a heading correction or a predetermined excavation path change, the drilling vectors DV may be offset at an angle other than 90 degrees from the face plane FP. This would result in a back plane BP that is not parallel to the face plane FP. In addition, this would require that the drilling depth of various drill holes may be different from one another, precisely because the distance between the face plane FP and the back plane BP may be shorter along a first drilling vector $DV_1$ than along a second drilling vector $DV_2$. The computer may be adapted to account for the distance and orientation between the face plane FP and the back plane BP so as to calculate the desired position, angle, and/or depth of each drill hole along each drilling vector DV.

The markers 22 are illustrated as being behind the drilling machine 12 such that the calculated face plane FP is in front of the drilling machine 12 along a longitudinal direction of a mine passage. It is contemplated drilling crosscuts, such as at a 90 degree angle (or any other predetermined angle) from the longitudinal direction of the mine passage. In such an embodiment, the markers 22 may be oriented so as to create the survey vector SV coordinating with a desired direction of the crosscut.

Each of the following terms written in singular grammatical form: "a", "an", and "the", as used herein, means "at least one", or "one or more". Use of the phrase One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise. For example, the phrases: "a unit", "a device", "an assembly", "a mechanism", "a component, "an element", and "a step or procedure", as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated components), feature(s), characteristic(s), parameter(s), integer(s), or step (s), and does not preclude addition of one or more additional components), feature(s), characteristic(s), parameter(s), integer(s), step(s), or groups thereof. Each of these terms is considered equivalent in meaning to the phrase "consisting essentially of. Each of the phrases "consisting of and "consists of," as used herein, means "including and limited to".

The phrase "consisting essentially of," as used herein, means that the stated entity or item (system, system unit, system sub-unit device, assembly, sub-assembly, mechanism, structure, component element or, peripheral equipment utility, accessory, or material, method or process, step or procedure, sub-step or sub-procedure), which is an entirety or part of an exemplary embodiment of the disclosed invention, or/and which is used for implementing an exemplary embodiment of the disclosed invention, may include at least one additional feature or characteristic" being a system unit system sub-unit device, assembly, sub-assembly, mechanism, structure, component or element or, peripheral equipment utility, accessory, or material, step or procedure, sub-step or sub-procedure), but only if each such additional feature or characteristic" does not materially alter the basic novel and inventive characteristics or special technical features, of the claimed item.

The term "method", as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Terms of approximation, such as the terms about, substantially, approximately, etc., as used herein, refers to ±10% of the stated numerical value. "Generally" means as close to a characteristic as possible, such as "generally parallel" or "generally perpendicular."

The phrase "operatively connected," as used herein, equivalently refers to the corresponding synonymous phrases "operatively joined", and "operatively attached," where the operative connection, operative joint or operative attachment, is according to a physical, or/and electrical, or/and electronic, or/and mechanical, or/and electro-mechanical, manner or nature, involving various types and kinds of hardware or/and software equipment and components.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub-combination in the context or format of a single embodiment may also be illustratively described and presented in the context or format of a plurality of separate embodiments.

The invention claimed is:

1. A system for use in drilling one or more boreholes in a face of a mine passage including at least two markers attached to the mine passage in a line, comprising:
    a drilling machine including a drill for drilling the borehole and a feed for feeding the drill;
    a first sensor for sensing a position of the at least two markers; and
    a computer configured to determine, based on the sensed positions of the at least two markers: (i) a survey vector generally parallel to the line; and (ii) a face plane generally orthogonal to the survey vector and coincident with an approximate location where the survey vector intersects the face.

2. The drilling system of claim 1, further including a second sensor configured to scan at least a portion of the face to be drilled.

3. The drilling system of claim 2, wherein the second sensor comprises a LiDAR unit.

4. The drilling system of claim 2, wherein the second sensor comprises a front sensor positioned on a front portion of the drilling machine.

5. The drilling system of claim 2, wherein the second sensor comprises side sensors located on opposite side portions of the drilling machine.

6. The drilling system of claim 2, wherein the first sensor is located on a rear portion of the drilling machine and directed rearwardly for sensing the at least two markers.

7. The drilling system of claim 2, wherein the second sensor is configured to generate a laser curtain at a predetermined distance between the drilling machine and the face and continuously monitor the laser curtain for a breach thereof.

8. The drilling system of claim 7, wherein the computer is configured to prevent movement of the drilling machine or generate an alarm in response to a detection of the breach of the laser curtain.

9. The drilling system of claim 1, wherein the computer is configured to utilize the survey vector and the face plane to apply a pre-determined drilling pattern to the face to be drilled.

10. The drilling system of claim 1, wherein the computer includes a plurality of drilling vectors, each of the plurality of drilling vectors corresponding to one of a plurality of boreholes to be drilled in the face.

11. The drilling system of claim 10, wherein the computer is configured to calculate a back plane, wherein a distance between the back plane and the face plane is equal to a depth of the plurality of boreholes to be drilled.

12. The drilling system of claim 11, wherein a depth of each of the plurality of boreholes to be drilled in the face is approximately equal, such that a distance between the back plane and the face plane is the same along each of the plurality of drilling vectors.

13. The drilling system of claim 11, wherein a depth of a first of the plurality of boreholes to be drilled is different from a depth of a second of the plurality of boreholes to be drilled, such that a distance between the back plane and the face plane is different along a first of the plurality of drilling vectors than along a second of the plurality of drilling vectors.

14. The drilling system of claim 1, further including a controller for controlling the feed for feeding the drill based on the location of the face plane to form the one or more boreholes in the face.

15. A system for use in drilling boreholes in a face of a mine passage including at least two markers attached to the mine passage in a line, comprising:
    a vehicle including a pair of booms, each including a drill for drilling one borehole and a feed for feeding the drill toward the face;
    a first sensor on a rear portion of the vehicle for sensing a position of the at least two markers;
    a second sensor on a front portion of the vehicle for sensing a topography of the face;
    a computer configured to determine, based on the sensed positions of the at least two markers and the sensed topography of the face: (i) a survey vector generally parallel to the line; (ii) a face plane generally orthogonal to the survey vector and coincident with an approximate location where the survey vector intersects the face, and (iii) a back plane corresponding to a depth of the boreholes to be drilled.

16. The system of claim 15, further including a controller for controlling the feeding of the drills based on the location of the face plane and the back plane to form the boreholes in the face.

17. A method for use in drilling a plurality of boreholes in a face of a mine passage using a drilling machine, the mine passage including at least two markers arranged in a line, comprising:
    determining a survey vector generally parallel to the line;
    determining a face plane generally orthogonal to the survey vector and coincident with an approximate location where the survey vector intersects the face of the mine passage; and
    drilling the plurality of boreholes at the determined face plane according to a drilling pattern including a drilling vector for each of the plurality of boreholes.

18. The method of claim 17, wherein the step of determining the survey vector comprises determining the location of the at least two markers using a LiDAR unit.

19. The method of claim 17, wherein the step of determining the face plane comprises scanning the face using a LiDAR unit.

20. The method of claim 17, further including the step of determining a back plane corresponding to an equal depth for each of the plurality of boreholes to be drilled.

21. The method of claim 17, further including the steps of:
    generating a laser curtain at a predetermined distance between the drilling machine and the face;
    monitoring the laser curtain for a breach thereof; and
    stopping movement of the drilling machine upon detecting the breach.

* * * * *